(12) United States Patent
Storgato et al.

(10) Patent No.: US 8,292,704 B2
(45) Date of Patent: Oct. 23, 2012

(54) MOTOR-VEHICLE DASHBOARD WITH MAIN CENTRAL PORTION HAVING NO OUTFLOW APERTURES FOR THE VENTILATION AIR

(75) Inventors: Angelo Storgato, Orbassano (IT); Giovanni Boreanaz, Orbassano (IT); Giorgio Masoero, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 701 days.

(21) Appl. No.: 12/424,900

(22) Filed: Apr. 16, 2009

(65) Prior Publication Data

US 2010/0026034 A1 Feb. 4, 2010

(30) Foreign Application Priority Data

Jul. 31, 2008 (EP) ..................................... 08425532

(51) Int. Cl.
*B60S 1/00* (2006.01)
(52) U.S. Cl. .......................... 454/121; 454/127; 454/152
(58) Field of Classification Search .................. 454/121, 454/127, 152, 155; 296/84.1, 70
See application file for complete search history.

(56) References Cited

U.S. PATENT DOCUMENTS

| 1,843,716 | A | | 2/1932 | Giller |
| 4,223,754 | A | * | 9/1980 | Mizuno et al. .................. 180/90 |
| 4,637,298 | A | * | 1/1987 | Yoshikawa et al. ........... 454/127 |
| 6,666,760 | B2 | * | 12/2003 | Elliot et al. .................... 454/121 |
| 7,118,154 | B2 | * | 10/2006 | Yamazaki et al. .............. 296/70 |

(Continued)

FOREIGN PATENT DOCUMENTS

EP 0 416 523 3/1991

(Continued)

OTHER PUBLICATIONS

Communication Under Rule 71(3), issued Mar. 25, 2010 in connection with EP Application No. 08425532.2, corresponding to the above-referenced Application.

(Continued)

*Primary Examiner* — Steven B McAllister
*Assistant Examiner* — Brittany E Towns
(74) *Attorney, Agent, or Firm* — Nixon & Vanderhye P.C.

(57) ABSTRACT

A dashboard for a motor vehicle is prearranged in such a way that the air for ventilation of the passenger compartment of the motor vehicle that exits from a top opening of the dashboard is deviated, by the Coanda effect, along the top surface of the dashboard and beyond the dashboard in the direction of the occupants of the passenger compartment. The dashboard is moreover provided with at least one flow-perturbing element, which can be brought into an active position thereof, in which it projects above the top surface of the dashboard, in an area immediately downstream of the aforesaid top opening, with reference to the direction of the flow of air coming out of the top opening. In the active position of the flow-perturbing element, the flow of air coming out of the top opening is deviated towards the windscreen of the motor vehicle. The movement of the flow-perturbing element is governed in synchronism with the movement of an open/close element that controls the flow of air to side front openings provided on the front surface of the dashboard, for the flow of air into the passenger compartment, and to auxiliary side openings, provided at the ends of the dashboard, for outflow of air in the direction of the side windows of the motor vehicle. The dashboard is without outlet openings for the air in the main central portion of its front surface, facing the occupants of the passenger compartment.

4 Claims, 16 Drawing Sheets

U.S. PATENT DOCUMENTS

2008/0108291 A1* 5/2008 Biasiotto et al. .......... 454/69

FOREIGN PATENT DOCUMENTS

| EP | 1 580 053 | 9/2005 |
|----|-----------|--------|
| EP | 1 382 472 | 12/2005 |
| EP | 1 544 007 | 4/2006 |
| EP | 1 585 642 | 4/2006 |
| EP | 1 544 005 | 5/2006 |
| EP | 1 368 207 | 7/2006 |
| EP | 1 920 955 | 5/2008 |
| FR | 2873628 A1 * | 2/2006 |
| GB | 2334780 A * | 9/1999 |
| JP | 2003 276431 | 9/2003 |
| JP | 2006 062500 | 3/2006 |
| WO | WO 2006/083430 | 8/2006 |

OTHER PUBLICATIONS

European Search Report for EP 08425532.2 dated Dec. 1, 2008.

* cited by examiner

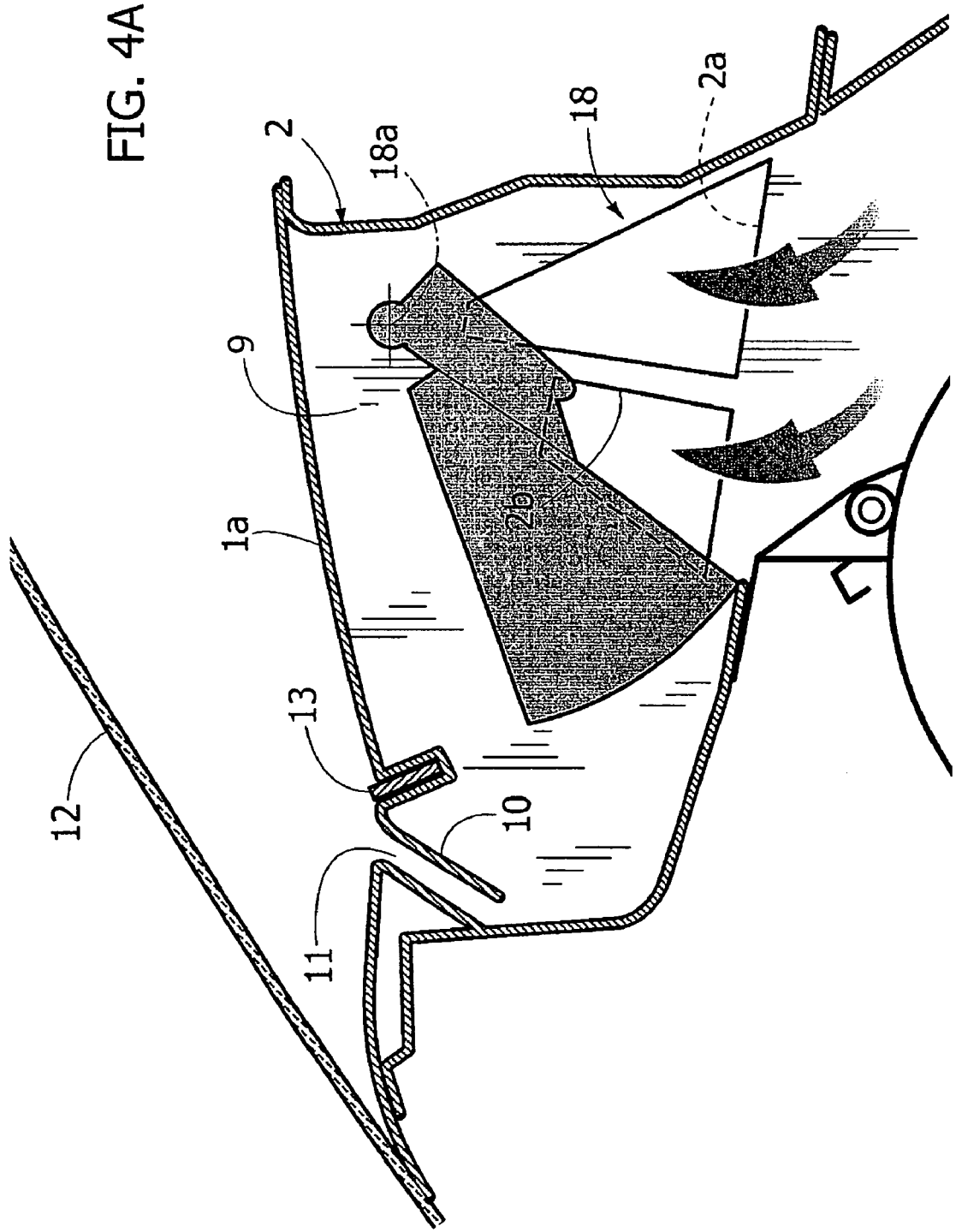

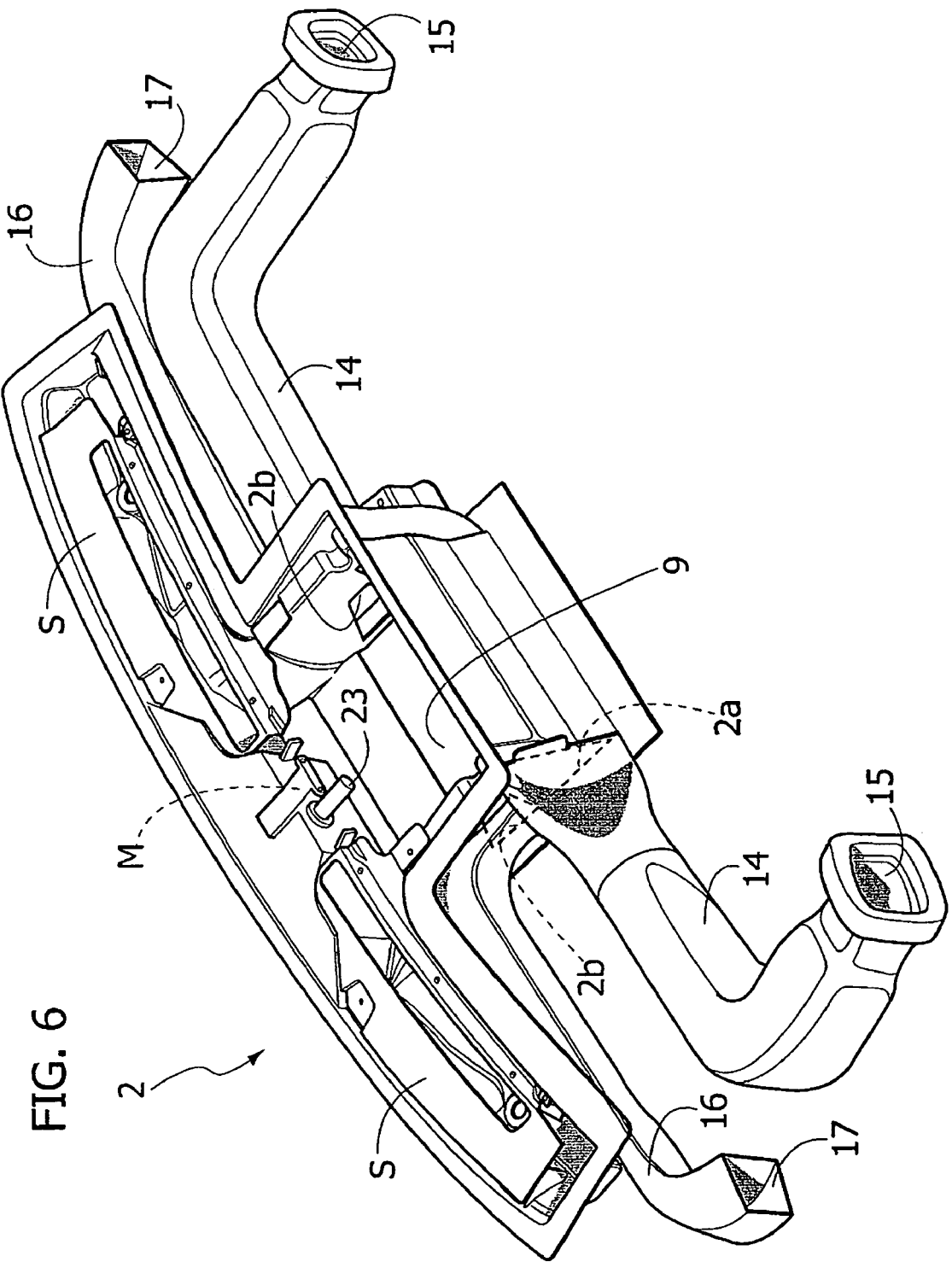

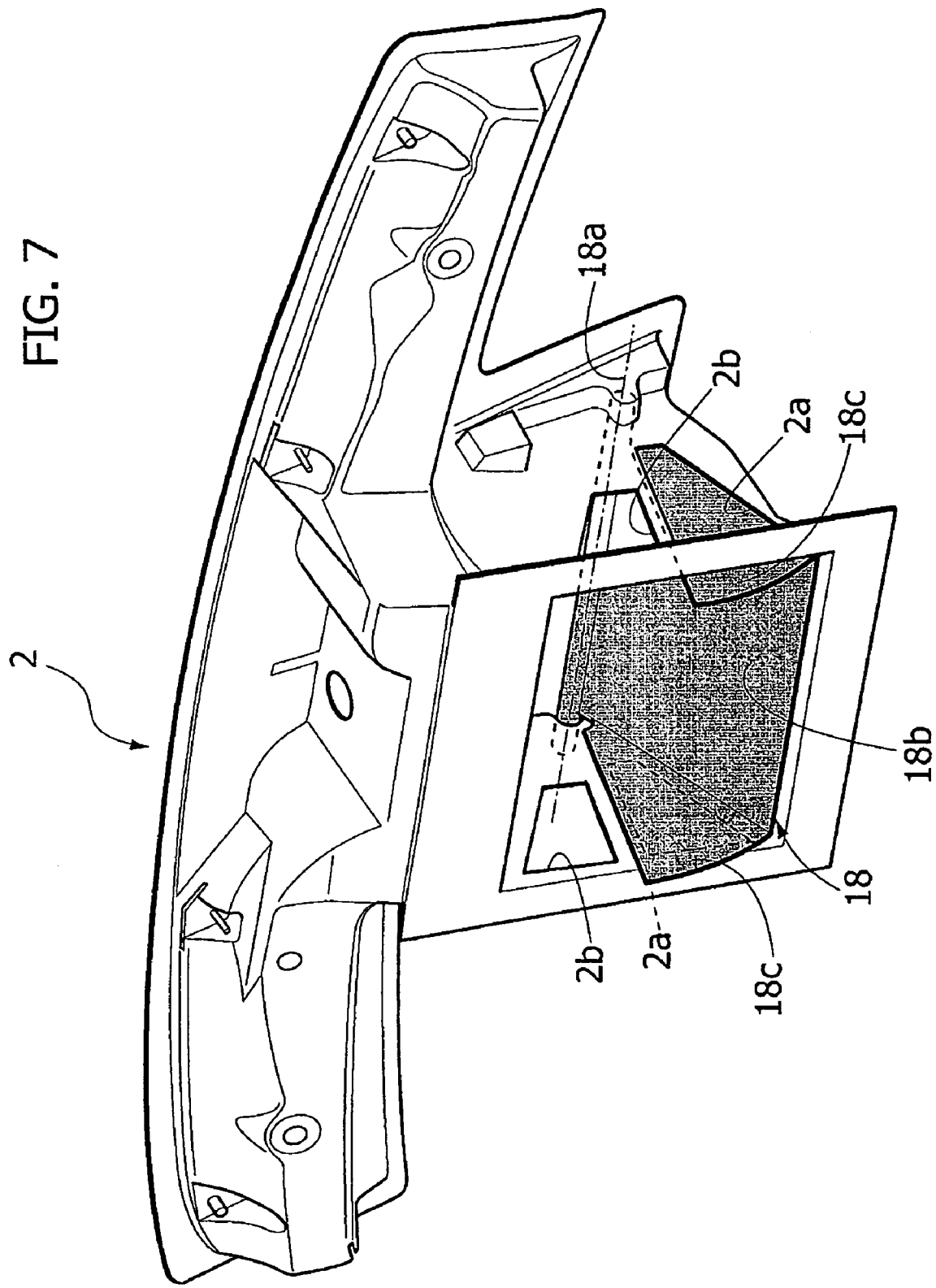

MOTOR-VEHICLE DASHBOARD WITH MAIN CENTRAL PORTION HAVING NO OUTFLOW APERTURES FOR THE VENTILATION AIR

The present invention relates to a dashboard of the type comprising a body having inside it passages for the air for ventilation of the passenger compartment of the motor vehicle, which give out onto a plurality of openings provided on the dashboard for outflow of air into the passenger compartment of the motor vehicle, wherein said openings comprise at least one top opening, provided in the top area of the dashboard, adjacent to the windscreen of the motor vehicle, in which the arrangement of said top opening, the orientation of the passage that gives out into said top opening, and the arrangement and profile of the top surface of the dashboard are such that in use the flow of air coming out of the top opening tends to adhere, by the Coanda effect, to said top surface of the dashboard and to proceed beyond the dashboard in the direction of the occupants of the passenger compartment, wherein the dashboard is provided with at least one flow-perturbing element that can be displaced between an inactive position where it is set back underneath the top surface of the dashboard and an active position where it projects from the top surface of the dashboard, in an area downstream of the top opening, with reference to the direction of the flow coming out of the top opening, in such a way that, when the flow-perturbing element is in its inactive condition, the flow of air coming out of the top opening remains adherent, by the Coanda effect, to the top surface of the dashboard and proceeds beyond the dashboard in the direction of the occupants, whereas, when the flow-perturbing element is in its active condition, projecting from the top surface of the dashboard, the flow of air coming out of the top opening detaches from the top surface of the dashboard and tends to adhere, by the Coanda effect, to the internal surface of the windscreen.

A dashboard of the type referred to above is described and illustrated in the document No. EP 1 920 955 A1 filed in the name of the present applicant.

Exploitation of the Coanda effect for directing a flow of air has been already proposed in the past. In particular, the present applicant is holder of various patents (see, for example, EP 1 368 207 B1, U.S. Pat. No. 1,843,716 B2, EP 1 382 472 B1, EP 1 585 642 B1, EP 1 544 005 B1, and EP 1 544 007 B1) that regard air-distribution systems in which a main flow of air is distributed between a number of secondary ducts that branch off from a main inlet duct exploiting the Coanda effect.

The Coanda effect, thus called from the name of the Rumanian scientist who described and studied it, is the effect whereby a flow of air that comes from a duct giving out into a wider chamber tends to adhere to the side wall of said chamber that is closest to the outlet mouth of the duct. The present applicant has proposed devices for distribution of air that exploit said phenomenon, particularly for air-conditioning systems for motor vehicles, in which the distribution of the air between the various ducts provided within the dashboard of a motor vehicle is controlled without the need for deflecting walls, which always entail a loss of energy in the flow of the air. Furthermore, the devices based upon the Coanda effect proposed in the past by the present applicant present the further advantage, as compared to other known devices that use fluid means for deviation of the flow, of not requiring the provision of transverse jets of air for controlling the direction of the main flow.

Application of the aforesaid concepts for the purpose of controlling the direction of the air coming out of the top opening of a motor-vehicle dashboard for orienting it selectively in the direction of the surface of the windscreen, for example for defrosting the windscreen ("defrosting function") or along the top surface of the dashboard and beyond, in the direction of the occupants, for directing towards them heated or cooled air ("venting function") has formed the subject of the European patent application No. EP 1 920 955 A1, filed in the name of the present applicant.

The object of the present invention is to perfect the device illustrated in EP 1 920 955 A1, by providing a dashboard for a motor vehicle that will at the same time be simple and functional.

SUMMARY OF THE INVENTION

With a view to achieving said purpose, the subject of the invention is a dashboard for a motor vehicle having all the characteristics that have been indicated at the start of the present description and moreover being characterized in that:
- the dashboard has a front surface, facing the occupants, which is without outlet openings for the air in a main central portion thereof and which has instead side front air-outlet openings in its end parts, adjacent to the two sides of the passenger compartment;
- the dashboard is provided inside with a mobile open/close element, having at least one first operative position for enabling flow of air towards the aforesaid side front openings, and one second operative position for disabling the flow of air towards the aforesaid side front opening; and
- control means are provided for controlling in synchronism the aforesaid flow-perturbing element between its inactive position and its active position, and the aforesaid open/close element between its first position and its second position, in such a way that, when the flow-perturbing element is in its inactive position, corresponding to orientation of the air coming out of the top opening of the dashboard along the top surface of the dashboard and in the direction of the occupants, the open/close element is in its first position for enabling flow of air towards the aforesaid side front openings, whilst, when the flow-perturbing element is in its active position, corresponding to orientation of the air at outlet from the top opening of the dashboard towards the internal surface of the windscreen, the open/close element is in its second position, corresponding to disabling of the flow of air towards the aforesaid side front openings.

In the preferred embodiment, the dashboard according to the invention is provided at its ends not only with the aforesaid side front openings but also with auxiliary side openings for directing air against the side windows of the motor vehicle, for a function of demisting of the side windows ("demister function"). Furthermore, the open/close element is pre-arranged for enabling flow of air to the aforesaid auxiliary side openings when it is in its aforesaid second position, corresponding to disabling of the side front openings, and for disabling the flow of air to the aforesaid auxiliary side openings when it is in its first position, corresponding to enabling of the side front openings.

According to a further preferred characteristic, the open/close element moreover presents a third operative position, in which it disables flow of air to the aforesaid top opening of the dashboard and enables flow of air both to the aforesaid side front openings and to the aforesaid auxiliary side openings.

Once again in the case of the preferred embodiment, the dashboard includes an air-conditioning unit provided with at least one bottom opening for outflow of air in the direction of the feet of the occupants and a louvre within the air-conditioning unit designed to distribute the air coming from the air-conditioning system itself between a passage giving out onto said bottom opening and a passage that leads to a chamber, set in which is the aforesaid open/close element.

In the case of the aforesaid embodiment, the aforesaid control means comprise a single actuator, which governs, by means of respective transmissions, both the aforesaid open/close element and the aforesaid flow-perturbing element. In one example, said actuator is constituted by an electric motor. However, not to be ruled out is the use of actuators of a different type, nor to be ruled out is the provision of two separate actuators, one for control of the flow-perturbing element and the other for control of the open/close element. In this case, there are moreover provided electronic means for control of the two actuators designed to guarantee synchronized movement of the flow-perturbing element and of the open/close element, according to the desired logic, following upon a command issued by the user. Finally, neither to be ruled out is the case where the aforesaid control means comprise one or more manually operated levers or knobs.

Provided in the preferred embodiment are at least two perturbing elements, which are distributed along the dashboard and may be controlled also in a way altogether independent of one another so that, for example, the right-hand perturbing element may be in the active position whilst the left-hand perturbing element is in the inactive position, or vice versa.

The dashboard according to the invention presents the advantage of having the front surface that in its central prevalent portion is without openings for outflow of ventilation air, which is a desirable factor for stylists, both in so far as it enables greater freedom of design of the shape of the dashboard and in so far as it enables use of the area normally dedicated to the provision of outflow mouths for other functions, for example for provision of glove compartments or control panels.

BRIEF DESCRIPTION OF THE DRAWINGS

Further characteristics and advantages of the invention will emerge from the ensuing description, with reference to the annexed drawings, which are provided purely by way of non-limiting example and in which:

FIG. 4A illustrates a detail at an enlarged scale of FIG. 4;

FIG. 6 illustrates the structure represented in FIG. 5 completed with a series of ducts for conveying the ventilation air;

FIG. 7 is a view from beneath of the structure represented in FIG. 5, completed with the element constituting the open/close element that controls conveyance of the air to the outlet openings of the dashboard;

DETAILED DESCRIPTION OF THE INVENTION

Figure 1:
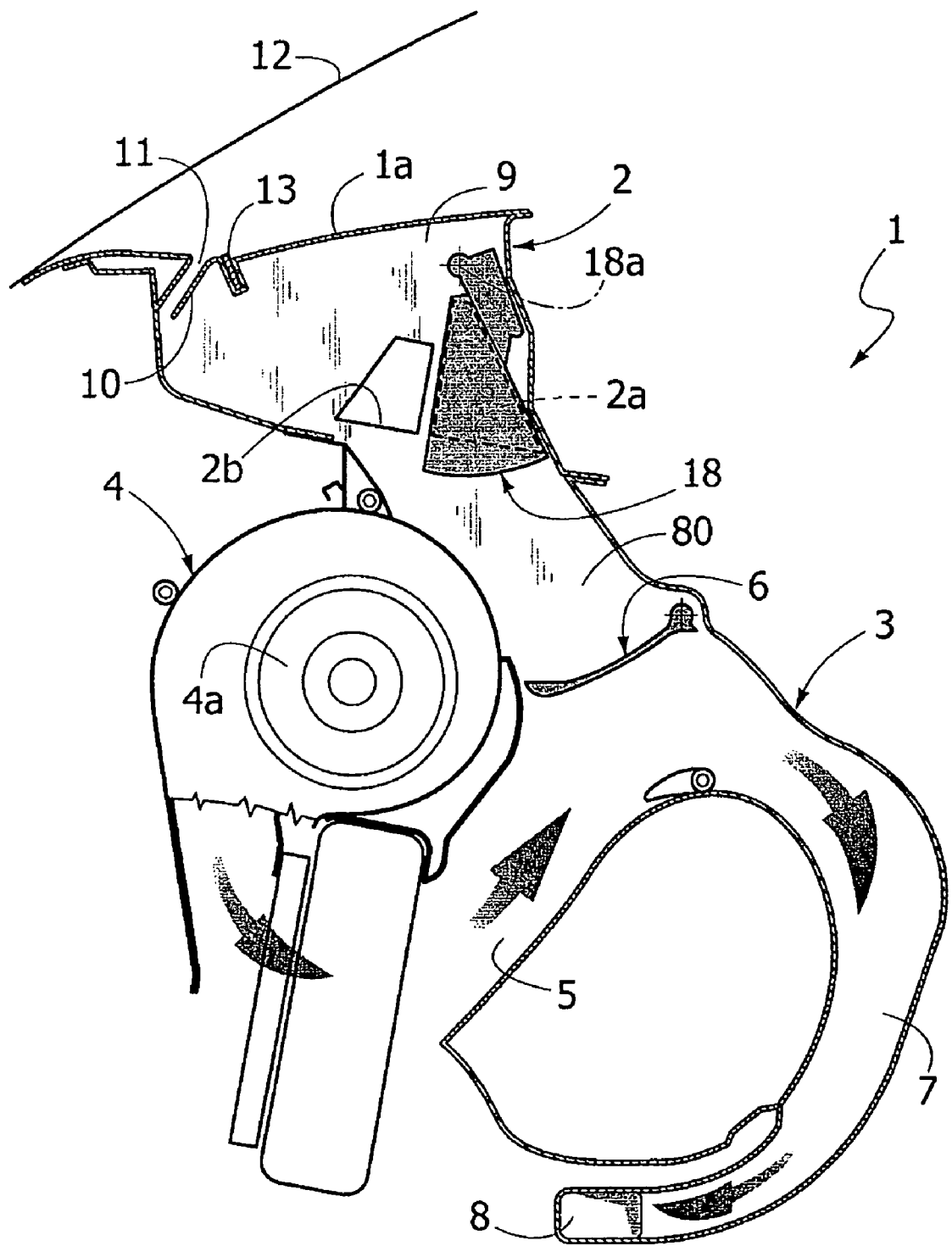
FIG. 1 is a schematic cross-sectional view of a preferred embodiment of the dashboard according to the invention, in a first operative condition.
Figure 5:
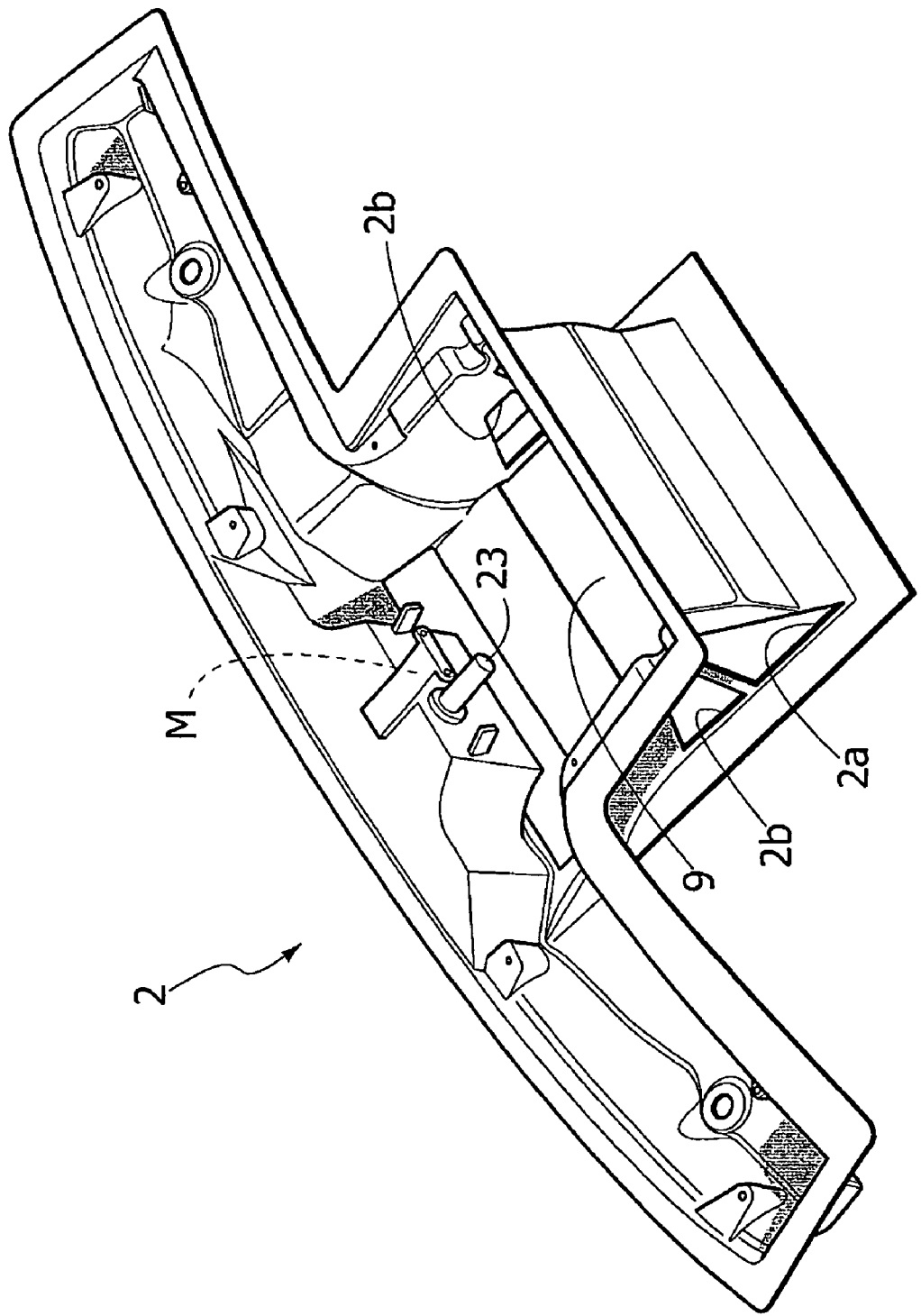
FIG. 5 is a perspective view of the top load-bearing structure, made of plastic material, of the dashboard of FIG. 1.

In FIG. 1, the reference number 1 designates as a whole a dashboard for a motor vehicle comprising a top body 2 made of plastic material, the conformation of which is clearly visible in FIG. 5 in perspective view. As may be seen in FIG. 1, beneath the body 2 the structure of the dashboard 1 has an air-conditioning system 3, 4. Said system can be made in any known way and does not fall, taken in itself, within the scope of the present invention. For this reason, the details regarding the air-conditioning system 3, 4 are neither described or illustrated herein, also because the elimination of said details from the drawings renders the latter more readily and easily understandable.

The air coming from the air-conditioning system enters a duct 5 (see FIG. 1), and from there is distributed, via an oscillating louvre 6, in itself of a known type, and governed by motor-driven or manually controlled means of a conventional type (not illustrated), between a duct 7 giving out into one or more bottom openings 8, for directing air into the area of the feet of the occupants of the front seats of the motor vehicle and an ascending duct 80, which gives out at the top into a chamber 9 defined between the walls of the central portion of the load-bearing structure 2 of the top body of the dashboard (see FIG. 5). From the chamber 9 the air supplied by the fan 4a of the air-conditioning system 4 can exit within the passenger compartment of the motor vehicle through one or more "chimneys" 10 and corresponding openings 11 at the top surface 1a of the dashboard, adjacent to the windscreen 12 of the motor vehicle. As was already envisaged in EP 1 920 955 A1, adjacent to the top (or openings) opening 11 the dashboard according to the invention is provided with flow-perturbing elements (which, in the specific case of the present embodiment are two in number), designated by the reference number 13, the structure and operation of which will be described in detail in what follows.

With reference once again to FIG. 5, the side walls of the central portion of the structure 2 have two pairs of lateral ports 2a, 2b. As illustrated in FIG. 6, the two lateral ports 2a are in communication with two ducts 14 that terminate with side front openings 15 for outflow of air into the passenger compartment of the motor vehicle, which are provided on the front surface of the dashboard, at the two ends thereof, in positions corresponding to the two side areas of the passenger compartment. Once again with reference to FIG. 6, the two lateral ports 2b are instead in communication with two ducts 16 that gives out into auxiliary side openings 17, which are also provided at the ends of the dashboard and have the function of directing air onto the side windows of the motor vehicle, for example, to perform a function of demisting of said side windows.

Opening and closing of the ports 2a, 2b is controlled by an open/close element 18, the structure of which is clearly visible in FIG. 7. The open/close element 18 is constituted by a louvre element mounted oscillating on the structure 2 about a transverse axis 18a and having a central wall 18b, substantially lying in a plane containing the axis 18a, and two side walls 18c (see FIG. 7) orthogonal to the central wall 18b and having a circular-sector conformation with centre on the axis 18a. As may be seen in the drawings, the ports 2a, 2b accordingly have a triangular shape tapered towards the axis 18a.

Figure 4:
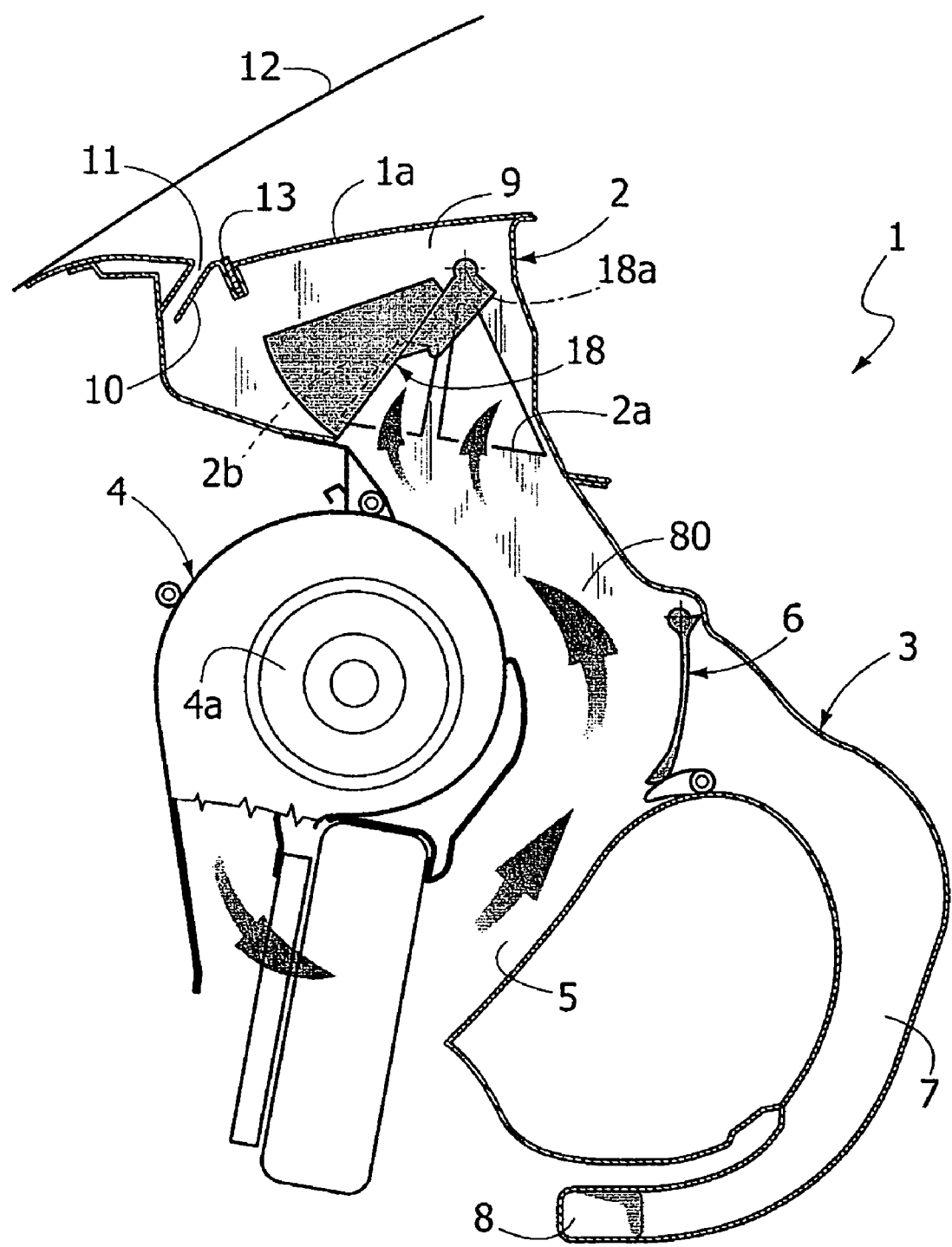
FIG. 4 illustrates a fourth operative condition.

As will be illustrated more clearly in what follows, the open/close element 18 has a first operative position, in which the side walls 18c occlude the ports 2b, a second operative position, in which the two side walls 18c occlude the ports 2a, and a third operative position, in which the central wall 18b closes the top end of the ascending duct 80 so that the air supplied by the air-conditioning system cannot reach the chimneys 10 that give out into the top openings 11 (FIG. 4).

With reference to FIG. 1, illustrated therein is the dashboard according to the invention in an operative condition in which the louvre 6 obstructs completely access of the air supplied by the air-conditioning system 4 to the ascending duct 80 so that the entire flow of the conditioned air enters the duct 7 that gives out into the bottom openings 8, for ventilation of the area of the occupants' feet.

Figure 2:
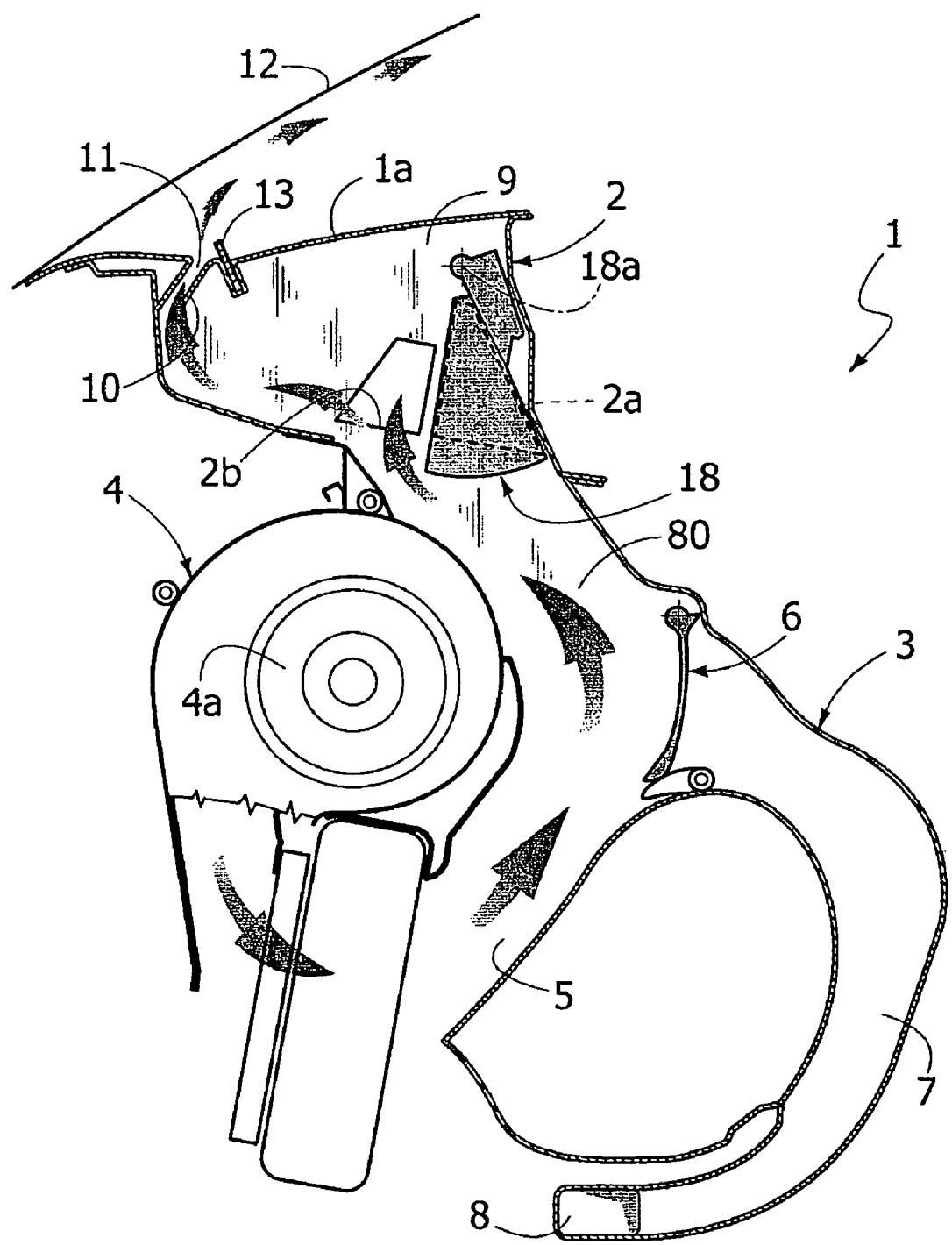
FIG. 2 is a cross section similar to that of FIG. 1 which illustrates, however, the dashboard in a second operative position.
Figure 2A:
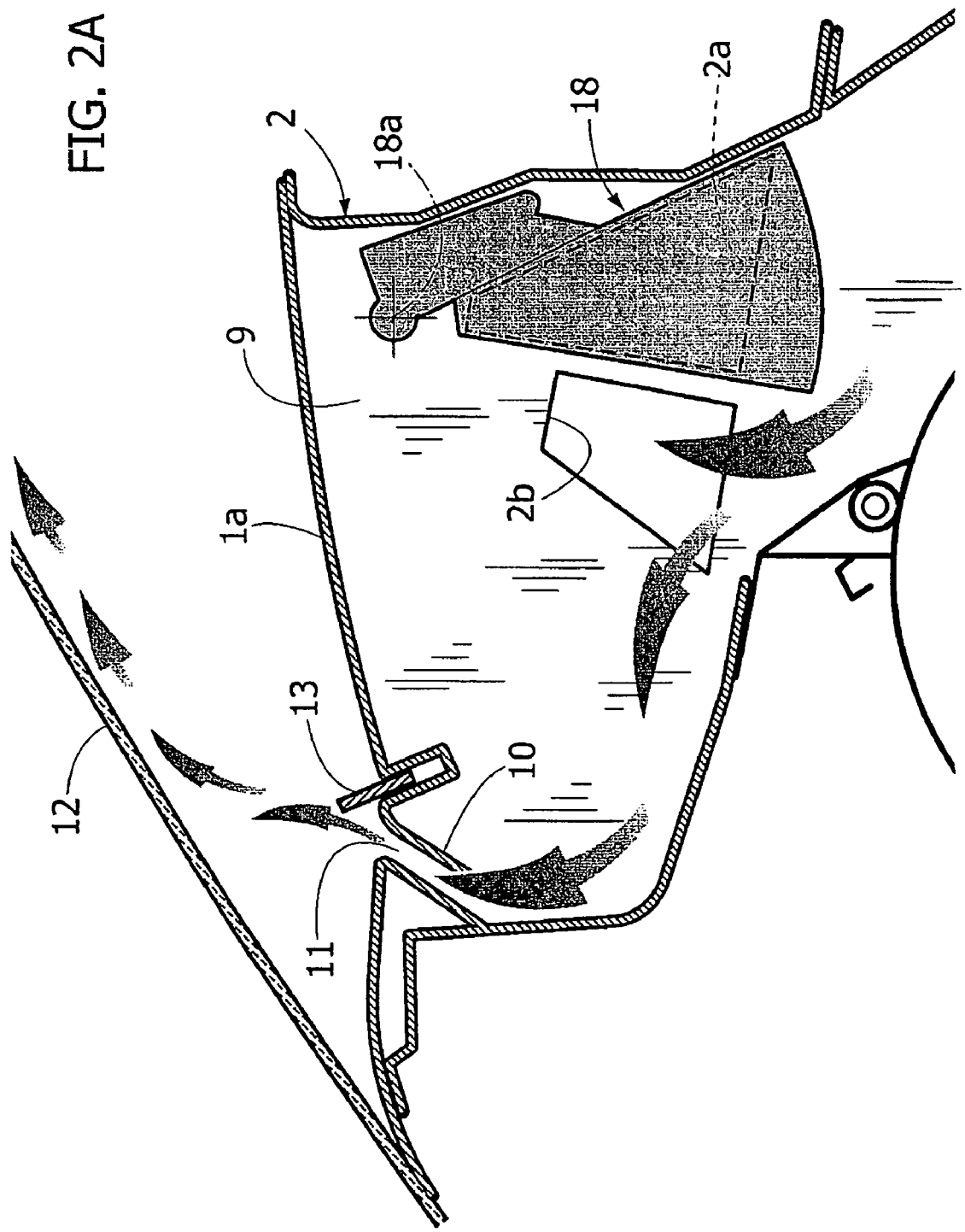
FIG. 2A illustrates a detail at an enlarged scale of FIG. 2.
Figure 8A:
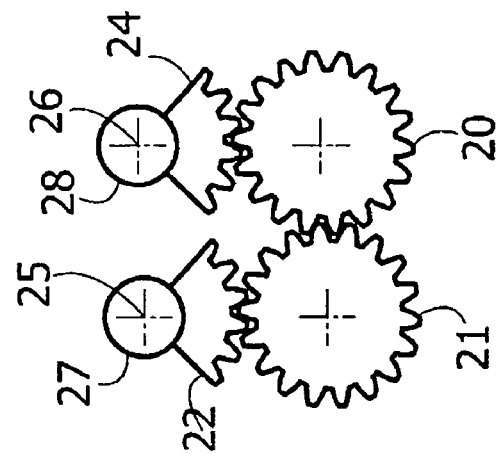
FIG. 8A illustrates a detail at an enlarged scale of FIG. 8.
Figure 8:
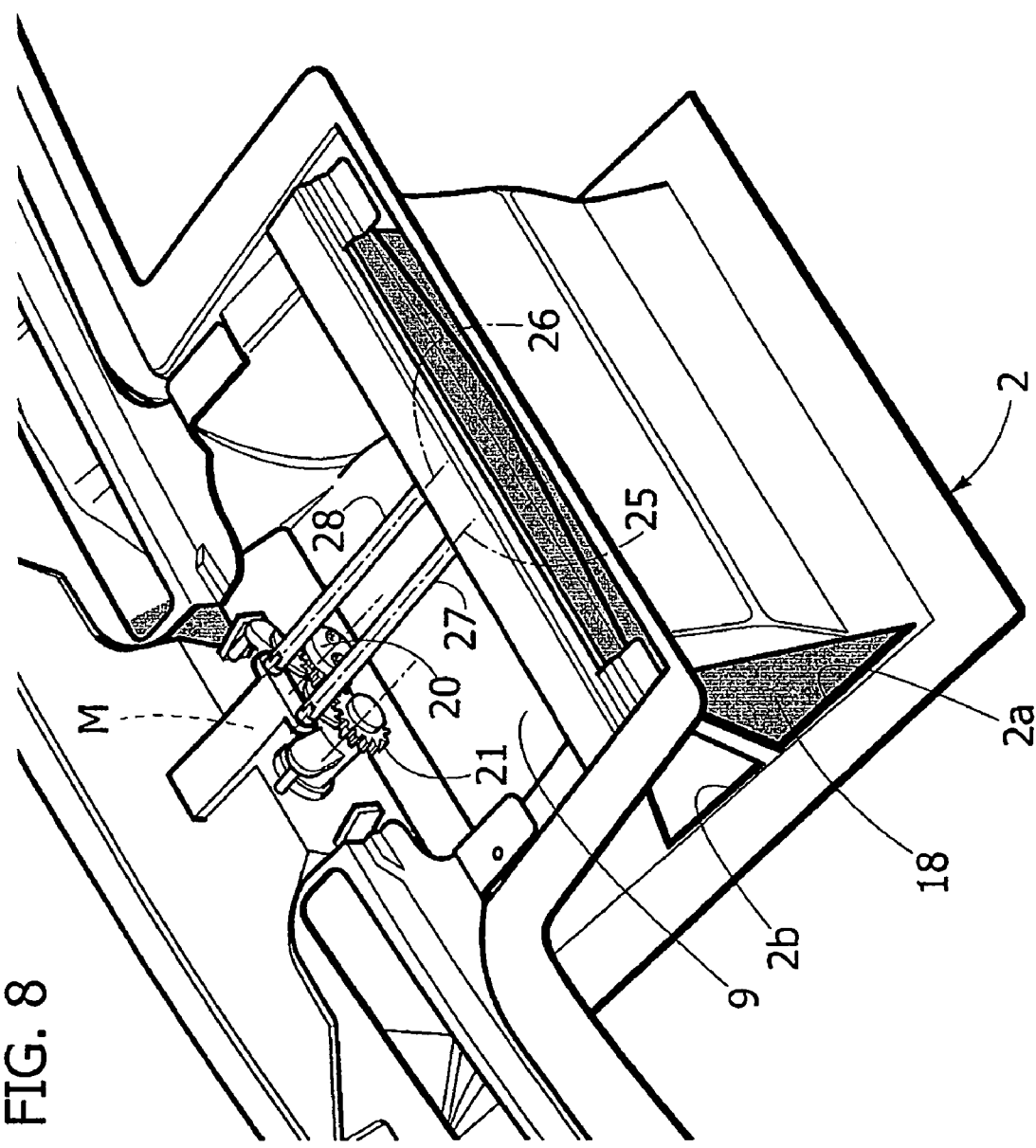
FIG. 8 is a view at an enlarged scale and from above of a detail of the structure represented in FIG. 5, completed with some parts of the transmission for actuation of the open/close element.

FIGS. 2 and 2a refer to the operative condition corresponding to the defrosting function. In said condition, the bottom louvre 6 is in its extreme position opposite to that of FIG. 8, where access to the bottom passage 7 that gives out into the bottom openings 8 is completely closed so that no ventilation air is supplied into the area of the feet of the occupants of the front seats of the motor vehicle. Consequently, in said condition, all the air is supplied through the ascending duct 80 and from there reaches the central chamber 9. The open/close element 18 is in its position where access to the side front openings 15 (FIG. 6) is obstructed. Free, instead, is access of the air through the chamber 9 and the lateral ports 2b (FIGS. 2, 2A, 5) to the ducts 16 that give out into the auxiliary side openings 17 for the function of demisting of the side windows. At the same time, in the operative condition that can be seen in FIGS. 2, 2A, the air supplied by the air-conditioning system can reach the chimney 10 and exit thence into the passenger compartment through the top opening 11. In said operative condition, each of the two flow-perturbing elements 13, which are constituted by blades set transverse within guide cavities 13a provided in the top surface of the dashboard (these will be illustrated more clearly in what follows with reference to FIGS. 11,12) are in their active position, projecting from the top surface 1a of the dashboard 1. Consequently, in said condition, according to the principle illustrated in EP 1 920 955 A1, the flow of air coming out of the top opening 11 detaches from the top surface 1a and is attracted, by the Coanda effect, towards the internal surface of the windscreen 12 so as to perform, for instance, a function of defrosting of the windscreen, in the case where the air is heated.

In the operative condition illustrated in FIGS. 2, 2A, there is thus obtained simultaneous defrosting of the windscreen and demisting of the side windows, through the air coming out of the auxiliary side openings 17, whereas no air comes out of the side front openings 15 or from the bottom opening 8 of the dashboard.

Figure 3:
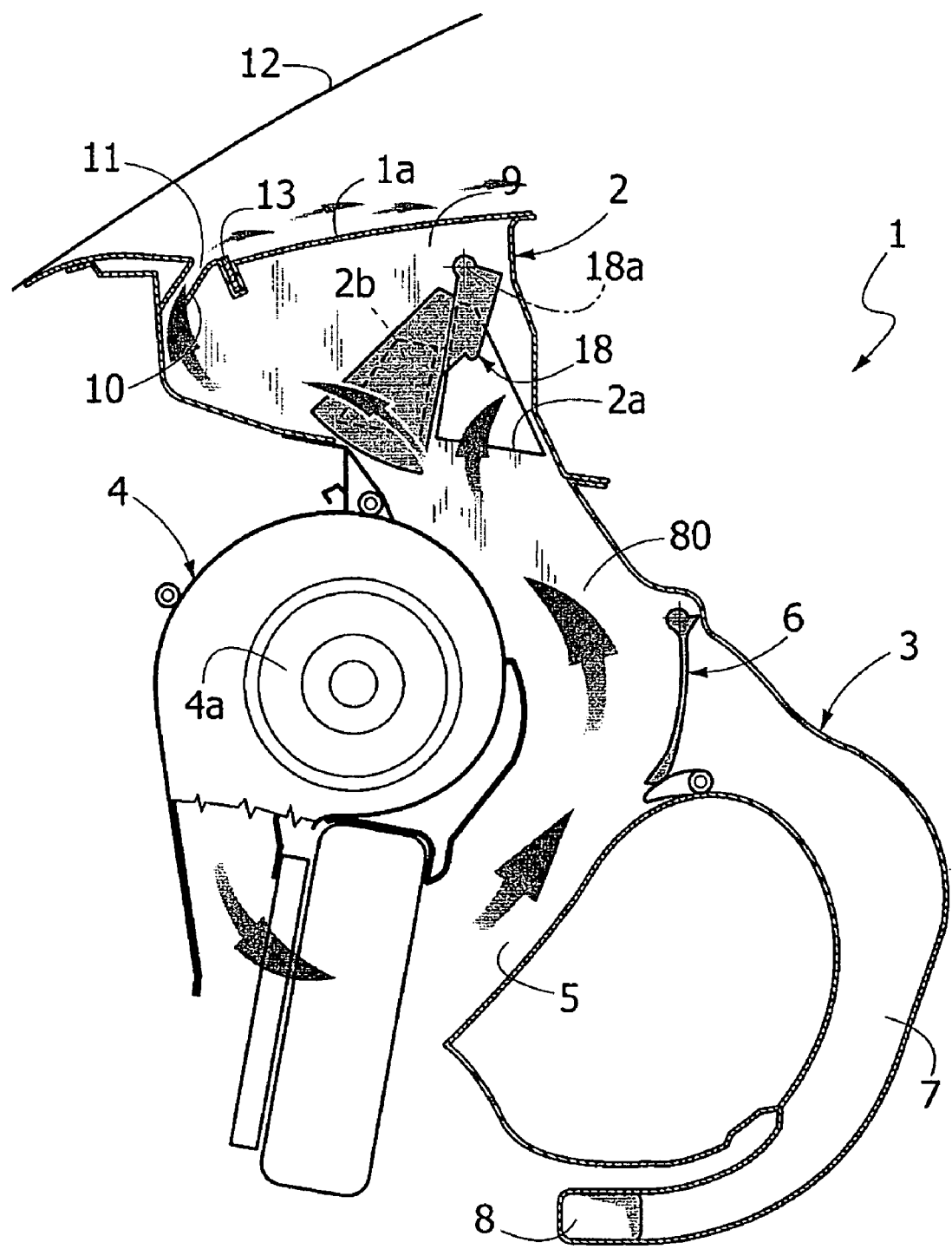
FIG. 3 illustrates the cross section of FIG. 1 in a third operative condition.
Figure 3A:
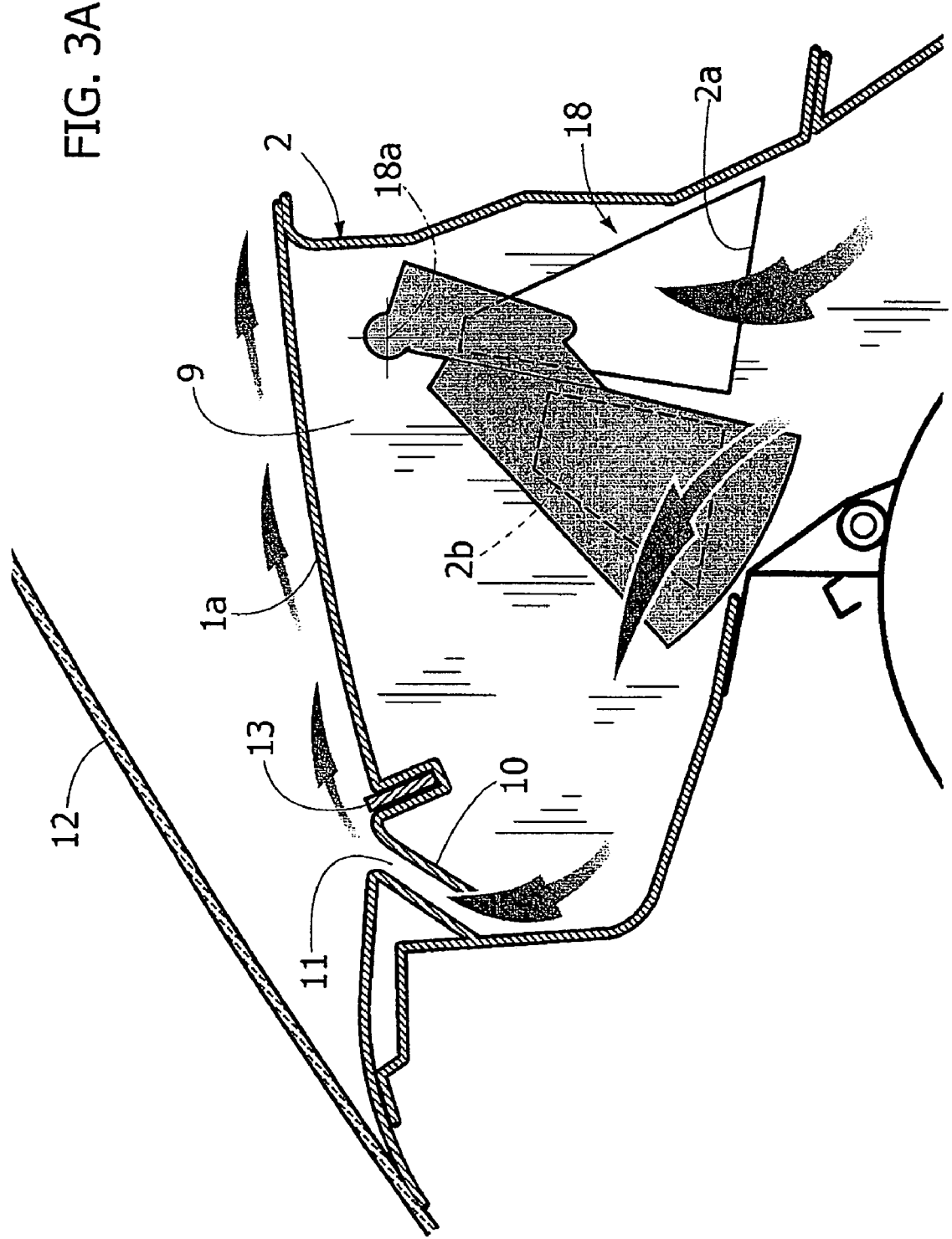
FIG. 3A illustrates a detail at an enlarged scale of FIG. 3.

FIGS. 3 and 3A refer to the operative condition that provides the venting function, where the louvre 6 is once again in the position already illustrated in FIG. 2 or in any case in a position where it lets at least a portion of the flow of air coming from the air-conditioning system reach the ascending duct 80. In said step, the flow-perturbing elements 13 are in their lowered position so that the air that exits from the top opening 11 of the dashboard is deviated, by the Coanda effect, along the top surface 1a of the dashboard and beyond the dashboard in the direction of the occupants of the passenger compartment of the motor vehicle, as is indicated by the arrows in FIG. 3A. Furthermore, in said operative condition, the open/close element 18 is in its operative position in which it occludes the lateral ports 2b and leaves open, instead, the lateral ports 2a. Consequently, in the venting condition no air reaches the auxiliary side openings 17 for demisting the side windows, whereas air comes out of the side front openings 15. Consequently, in the venting condition, the occupants of the passenger compartment receive a diffused flow of air, centrally coming from the top openings of the dashboard and flowing along the top surface of the dashboard and laterally from the outlet openings 15.

FIGS. 4, 4A illustrate a further operative condition, in which the open/close element 18 is in a third operative position where its central wall 18b prevents flow of air to the chimney 10, whereas air can reach, through the openings 2a, 2b, which are open, both the side front openings 15 and the auxiliary side openings 17 so as to perform both a function of lateral venting and the demister function for the side windows.

In the preferred embodiment that is illustrated, the movement of the open/close element 18 and the movement of the two flow-perturbing elements 13 are controlled by a single electric motor M (not visible in detail in the drawings) mounted on the structure 2 (FIG. 5). The motor M governs in rotation a pinion 20, which meshes with a further pinion 21 that is mounted so that it can turn freely on a shaft 23 (FIG. 5) carried by the structure 2. The two pinions 20, 21 (see FIGS. 8, 8A) have exactly the same diameter and mesh with two respective toothed sectors 22, 24 that are also mounted so that they can turn about axes 25, 26 parallel to one another on the structure 2 of the dashboard and are connected in rotation to two parallel shafts 27, 28 (see also FIG. 9).

Figure 9:
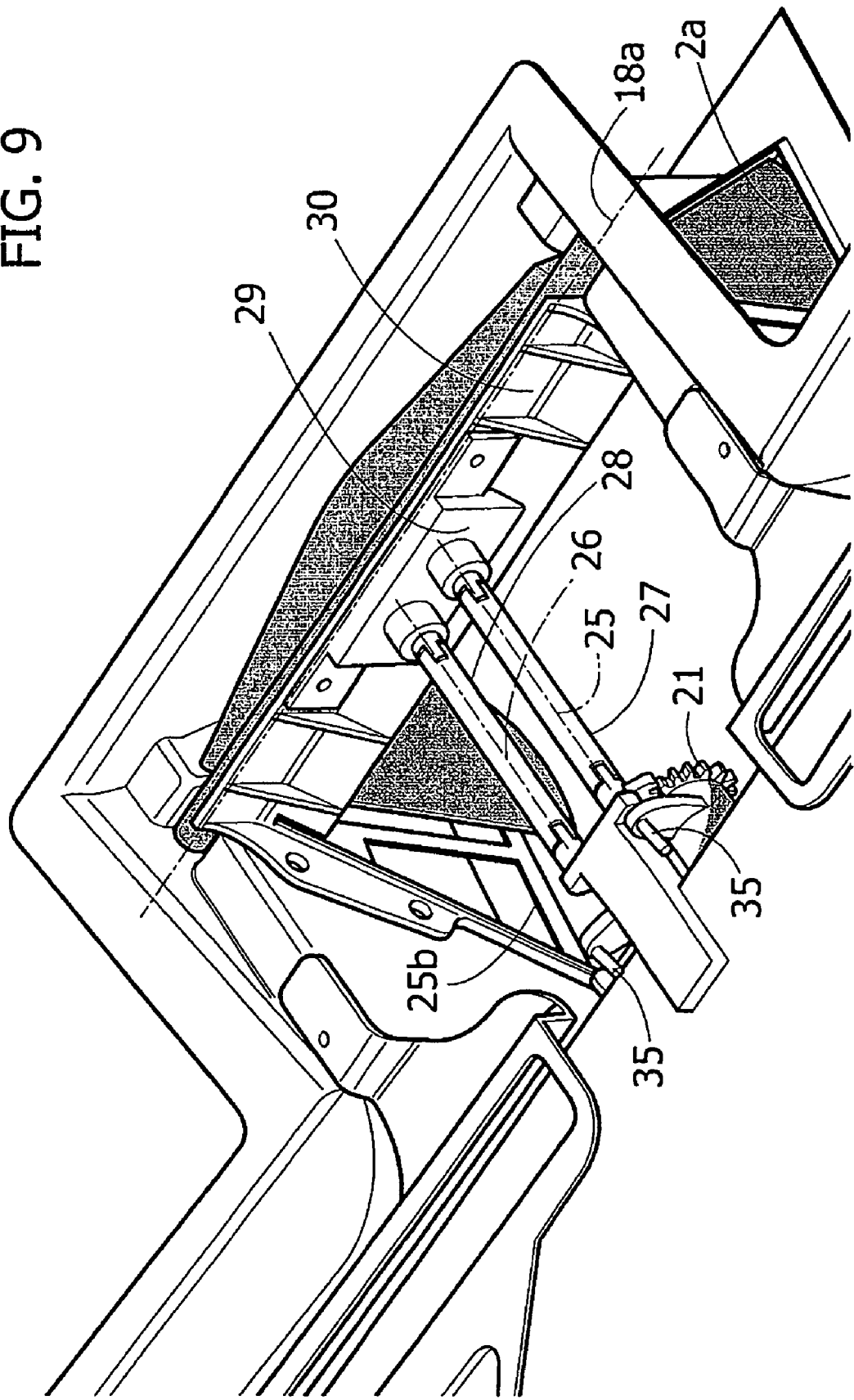
FIG. 9 is a further perspective view from above of the detail of FIG. 8, from a different viewpoint.
Figure 10:
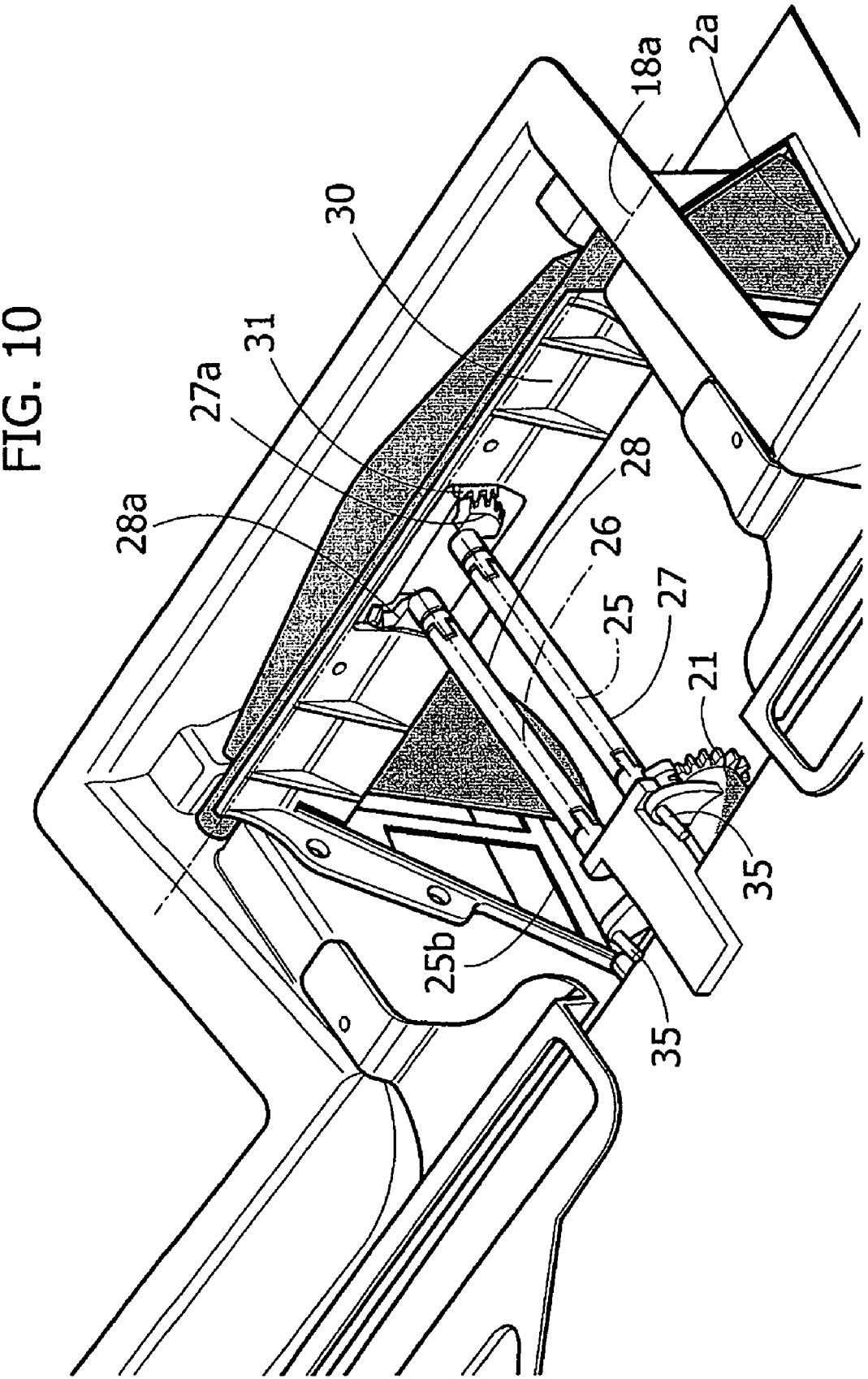
FIG. 10 is a view corresponding to that of FIG. 9, in which some parts have been removed to highlight the major parts of the transmission for actuation of the open/close element.

As may be seen in FIG. 9, the ends of the two shafts 27, 28 opposite to the ones connected to the two toothed sectors 25, 26 are supported, so that they can turn, by a bracket 29 fixed to a frame 30 (see also FIG. 10), which also functions as support for articulation about the axis 18a of the open/close element 18. As may be seen in FIG. 10, where the bracket 29 has been removed, the two ends of the shafts 27, 28 carry sectors of bevel pinions 27a, 28a (FIG. 10), which mesh with respective sectors of bevel pinions 31, rigidly connected to the open/close element 18 and having a common axis coinciding with the axis of articulation 18a of the open/close element 18.

Thanks to the arrangement described above, any activation of the motor M causes simultaneous rotation in opposite directions of the two shafts 27, 28, by means of the pinions 21, 20 and the toothed sectors 22, 24 and the consequent simultaneous rotation in opposite directions of the two sectors of bevel pinions 27a, 28a that both govern rotation of the open/close element 18. The motor M can be activated in both directions of rotation and associated thereto is an electronic control system that sees to deactivation of the motor when position-sensing means detect that the open/close element has reached the position selected by the user. In practice, as has been seen, the open/close element has three different operative positions corresponding each to one of the following functions: "defrosting+demister", "venting", and "lateral venting+demister".

Figure 11:
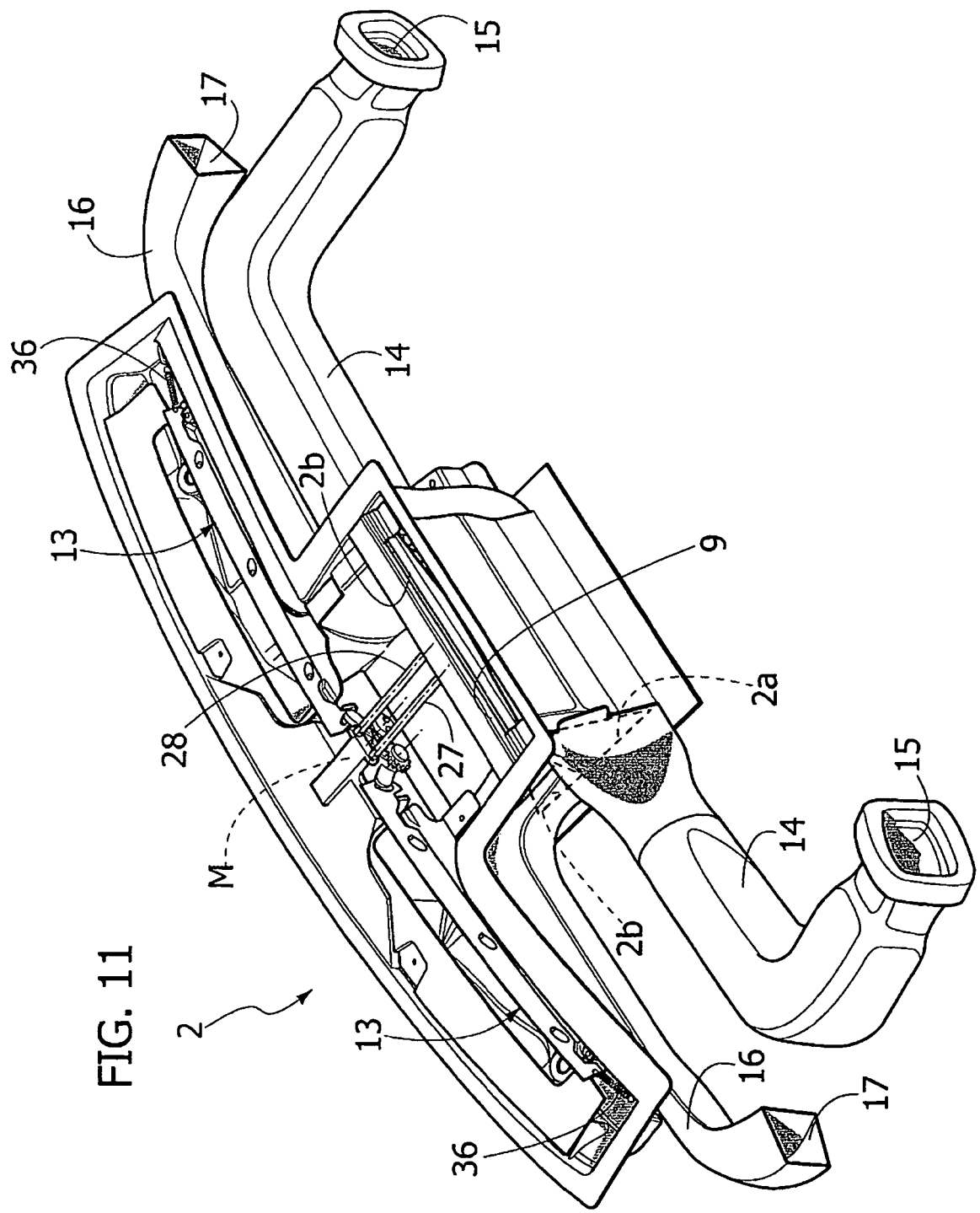
FIG. 11 is a further view of the structure of the dashboard completed with the two flow-perturbing elements with which the dashboard is provided, illustrated in their lowered position.
Figure 12:
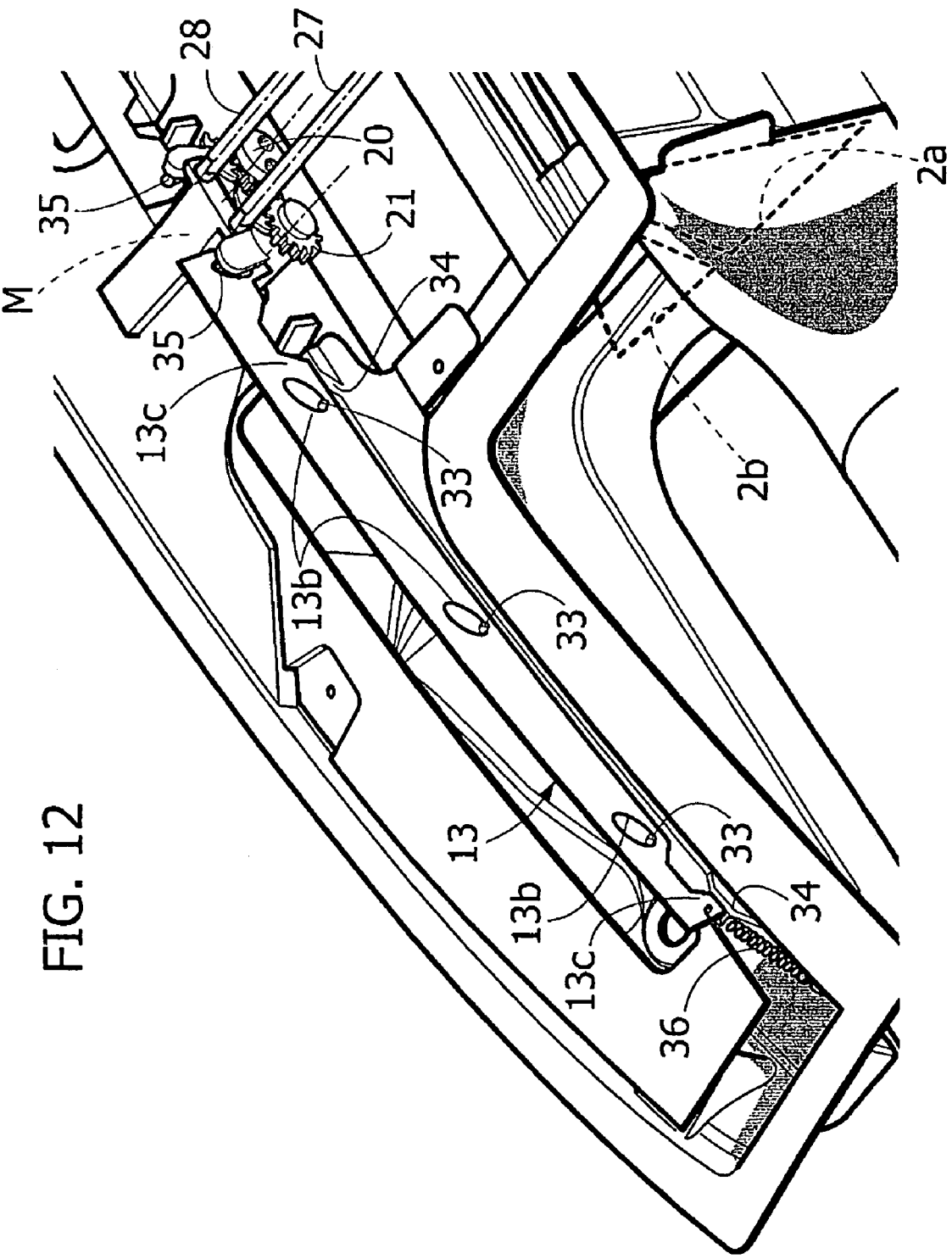
FIG. 12 is a view at an enlarged scale of a part of FIG. 11, in which the perturbing element visible therein has been illustrated in its raised position.
Figure 12A:
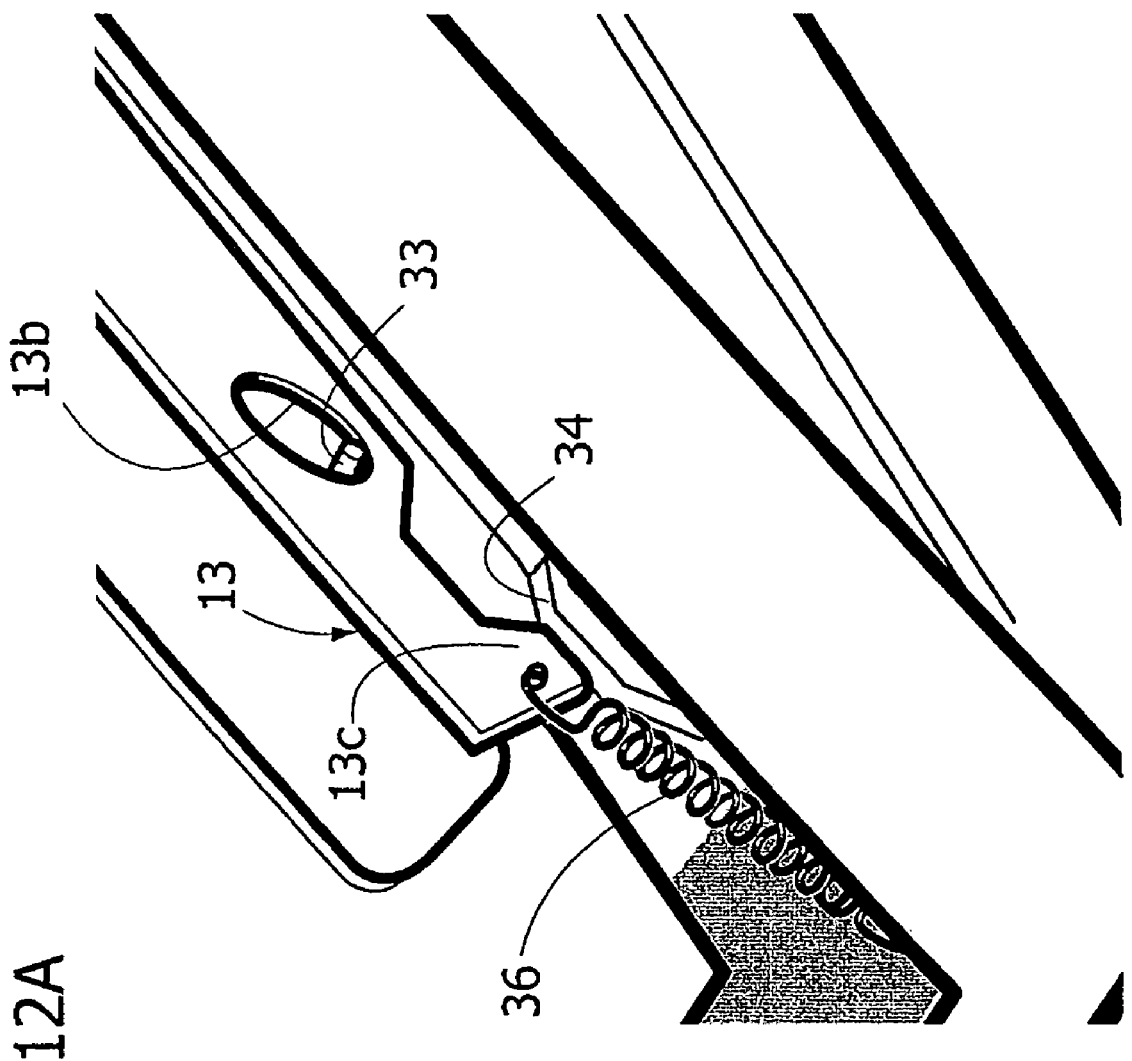
FIG. 12A illustrates a detail at an enlarged scale of FIG. 12.

With reference to FIGS. 11 and 12, the two perturbing elements 13 are constituted by two thin plates or blades set transversely with respect to the longitudinal direction of the motor vehicle, i.e., in the longitudinal direction of the dashboard. The blades are guided vertically within a guide cavity 13a (see FIG. 2A), which in the example illustrated is inclined upwards and forwards, with reference to the direction of advance of the motor vehicle, with respect to a vertical transverse plane. Each blade 13 has arched slits 13b within which guide pins 33 engage, which are carried by two supports S rigidly connected to the structure 2 of the dashboard. Furthermore, on its bottom surface each blade 13 has engagement parts 13c that are in sliding engagement on ramps 34 of a resting path for the blade 13, provided on the supports S. Each blade 13 has its end that faces the centre of the dashboard having a slit 13b, which is engaged by a respective crankpin 35 fixed in rotation with respect to the toothed sector 22 and to the toothed sector 24, respectively. At the opposite ends, adjacent to the ends of the dashboard, the two blades constituting the flow-perturbing elements 13 are subject to the tensile force exerted by two helical springs 36 set between the structure of the dashboard and the blades 13 in such a way as to tend to keep the blades 13 in a resting position, shifted in the direction of the respective end of the dashboard. In said condition, the engagement elements 13c are engaged on the bottom of the ramps 34 so that the blades 13 are in their lowered position. Starting from said position, the blades 13 can be shifted towards one another by the crankpins 35, following upon activation of the motor M, with a consequent sliding of the engagement elements 13c on the resting ramps 34 so that the two blades 13 displace into their raised position.

As has already been clarified above, in the lowered position of the blades 13, the latter are retracted beneath the top surface 1a of the dashboard, within the guide cavities 13a. In their raised position, instead, the blades 13 project above the top surface 1a of the dashboard (see FIG. 2A) in an area that is situated immediately downstream of the top openings 11 of the dashboard, with reference to the direction of the flow of air coming out of said openings.

The aforesaid arrangement is such that activation of the motor M causes synchronized movements of the open/close element 18 and of the flow-perturbing elements 13, according to the logic that has already been illustrated above. In particular, the two mechanical transmissions that connect the motor to the open/close element 18 and to the flow-perturbing elements 13 are such that, when the open/close element 18 is in its first operative position of occlusion of the lateral ports 2a, the flow-perturbing elements 13 are in their active position, projecting from above the top surface 1a of the dashboard (see FIGS. 2, 2A). When the open/close element 18 is in its second operative position of occlusion of the lateral ports 2b, the flow-perturbing elements 13 are in their inactive position, retracted beneath the top surface 1a of the dashboard (FIGS. 3, 3A).

Finally, when the open/close element 18 is in its third operative position, which obstructs access of the air to the top opening 11 completely, the flow-perturbing element is still in its inactive position (FIGS. 4, 4A).

Of course, as has already been clarified above, even though the preferred embodiment has been described with reference to the use of a single motor for synchronized control of the open/close element 18 and of the flow-perturbing elements 13, not to be ruled out is the use of any other type of electrical actuator or even the use of two separate electrical actuators, for control of the open/close element 18 and for control of the flow-perturbing elements 13. In this case, the two actuators are controlled by electronic control means that govern their synchronization. In particular, to control the flow-perturbing elements not to be ruled out either are actuators of the shape-memory type.

It is moreover evident that, without prejudice to the principle of the invention, the details of construction and the embodiments may vary widely with respect to what is described and illustrated herein purely by way of example, without thereby departing from the scope of the present invention.

What is claimed is:

1. A motor-vehicle comprising:
    a dashboard, including an upper hollow body extending longitudinally adjacent to the lower side of a windshield of the motor-vehicle and including a central portion projecting towards a passenger compartment of the motor-vehicle and defining a central chamber inside said central portion,
    an air-conditioning system arranged under said dashboard,
    said dashboard further comprising:
    a main duct for directing air from said air-conditioning system, both towards an ascending duct ending into said central chamber and towards a descending duct ending into openings for directing air to the feet of the occupants of the motor vehicle,
    an rotatable louver controlling the communication of said main duct with said ascending duct and said descending duct,
    an open/close element controlling the communication between said central chamber and an upper chamber extending longitudinally for the entire length of the dashboard below an upper wall of said dashboard,
    wherein said upper wall of the dashboard is formed with slits extending longitudinally adjacent to the lower side of the windshield for the outflow of air coming from said upper chamber,
    wherein said slits are defined by the outlet ends of conduits associated to said upper wall,
    wherein the orientation of said conduits and the profile of the upper surface of said upper wall of the dashboard are such that air coming out of said slits tends to remain attached, by the Coanda effect, to said upper wall of the dashboard and to proceed beyond the dashboard in the direction of the occupants of the passenger compartment of the motor vehicle,
    wherein said upper wall of the dashboard is provided with longitudinal recesses extending at an intersection of the upper wall of the dashboard, and the longitudinal recesses are parallel with the intersection of the upper wall of the dashboard and the slits, said recesses slidably guiding respective longitudinal blades between an inactive position in which said blades do not project from the upper surface of said dashboard upper wall and an active position in which said blades do project from said upper surface, so that, when the blades are in their inactive position, the flow of air coming out of said slits remains attached, by the Coanda effect, to the upper surface of the dashboard and proceeds beyond the dashboard in the direction of the occupants, whereas, when the blades are in their active position, the flow of air coming out of said slits is caused to detach from said upper surface and to be attracted, by the Coanda effect, towards the internal surface of the windscreen of the motor vehicle,
    wherein said central portion of the dashboard has a front surface facing toward the rear of the vehicle and facing the passenger compartment of the motor vehicle, the front surface is without openings for outlet of air, wherein said central portion of the dashboard has side walls having first side ports and second side ports, wherein said first side ports are in communication with two ducts ending into front outlets formed at the two opposite ends of the dashboard, for outflow of air into the passenger compartment of the motor vehicle, wherein said second side ports are in communication with two ducts ending into auxiliary outlets, which are also provided at the ends of the dashboard and have the function of directing air onto the side windows of the motor vehicle, for demisting of said side windows, wherein said open/close element has a body pivotally mounted within said central portion of the dashboard about an axis transverse with respect to the longitudinal direction of the motor vehicle, said body including a main planar wall extending radially from said articulation axis and side walls perpendicular to the main wall and facing the side walls of said central portion, wherein said open/close element has a first operative position, in which its side walls occlude said second side ports, a second operative position, in which its side walls occlude said first side ports, and a third operative position, in which the main wall closes the top end of said ascending duct so that the air supplied by the air-conditioning system cannot reach the conduits that give out into the slits on the upper surface of the dashboard, and wherein said dashboard further comprises a single electric motor mounted within the dashboard and adapted to control simultaneously two separate mechanical transmissions to drive in synchronism a movement of said blades and a movement said open/close element, in such a way that, when the blades are in their inactive position, the open/close element is in its first operative position corresponding to enabling of the flow of air to the aforesaid side front openings, whereas, when the blades are in their active position, the open/close element is in its second operative position.

2. The motor-vehicle of claim 1, wherein said blades are displaceable in the direction of their length, against the action of spring means, so as to slide on ramps formed in the body of the dashboard which cause a vertical movement of the blades out of said recesses.

3. The motor-vehicle of claim 2, wherein said electric motor is adapted to drive rotation of first and second pinions which drive two parallel shafts, said parallel shafts carrying first bevel pinion sectors meshing with second bevel pinion sectors which are rigidly connected to the open/close element coaxially with said axis of articulation.

4. The motor-vehicle of claim 3, wherein said blades have respective ends facing towards the centre of the dashboard and having respective slots, in which respective crankpins are engaged, said crankpins being rotatable with two toothed sectors, respectively driven by said first and second pinions.

* * * * *